(No Model.) 2 Sheets—Sheet 1.

J. A. TUPPER.
CAPILLARY FILTER.

No. 311,452. Patented Jan. 27, 1885.

WITNESSES:
E. B. Bolton
Geo. Bainton

INVENTOR:
John A. Tupper
By his Attorneys,
Burke Fraser Bennett (No Model.)　　　　　　　　J. A. TUPPER.　　　　2 Sheets—Sheet 2.
CAPILLARY FILTER.

No. 311,452.　　　　　　　　　　　Patented Jan. 27, 1885.

WITNESSES:　　　　　　　　　　　　　　　　INVENTOR:

UNITED STATES PATENT OFFICE.

JOHN A. TUPPER, OF SALT LAKE CITY, UTAH TERRITORY.

CAPILLARY FILTER.

SPECIFICATION forming part of Letters Patent No. 311,452, dated January 27, 1885.

Application filed May 1, 1884. (No model.)

*To all whom it may concern:*

Be it known that I, JOHN A. TUPPER, a citizen of the United States, residing in Salt Lake City, in the Territory of Utah, have invented certain new and useful Improvements in Capillary Filters, of which the following is a specification.

The object of this invention is to provide a practicable filter that shall utilize the property of capillary attraction for filtering purposes. It is a well-known fact that a wick draws up only the liquid in which it is partially immersed, leaving behind it the foreign matters contained therein and all such impurities as are not readily subject to capillary attraction. In order to render this capillary action available for practical purposes, I arrange a number of wick-tubes to pass through the bottom of a vessel and extend up into the same, and I place wicks in these tubes, causing them to hang over the top ends of the tubes and dip into the liquid in the vessel, and their other ends to extend downward through the tubes to a lower level, in order that the wicks shall act as siphons to draw the liquid up to the tops of the tubes and permit it to pass down through the tubes, where it drips from the lower ends of the wicks into some other vessel placed to collect the filtered liquid. In order to further purify the liquid, I arrange a series of such vessels one above another in such manner that the liquid shall be filtered several times successively.

The accompanying drawings illustrate one form of filter embodying my invention.

Figure 2:
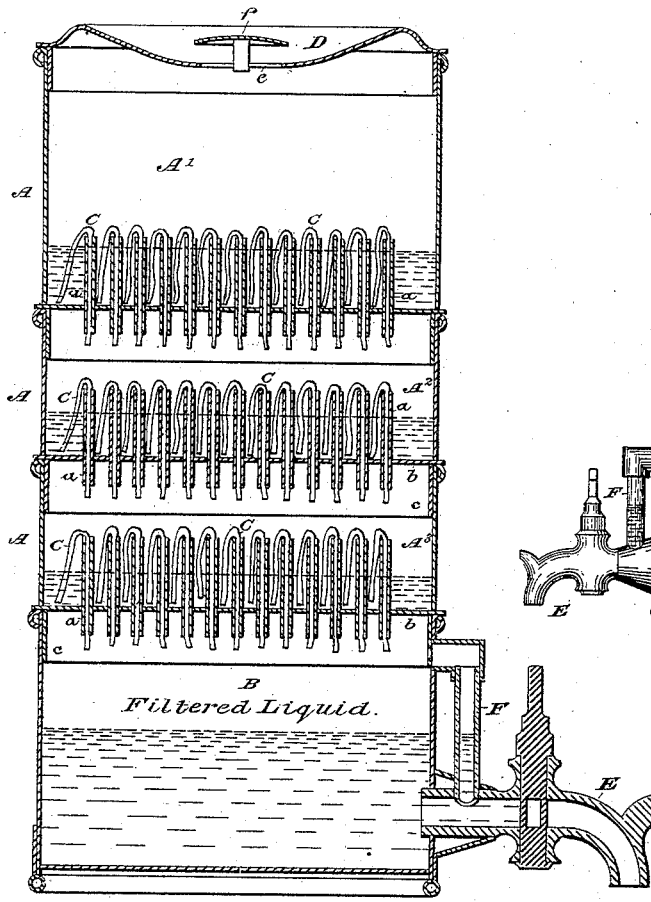
Figure 1:
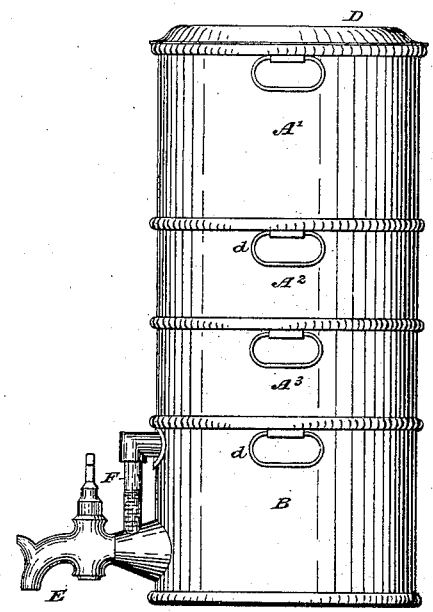
Figure 3:
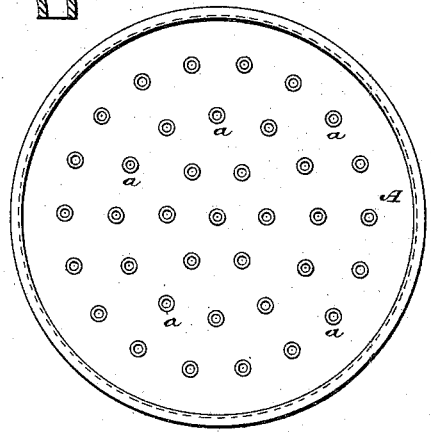
Figure 4:
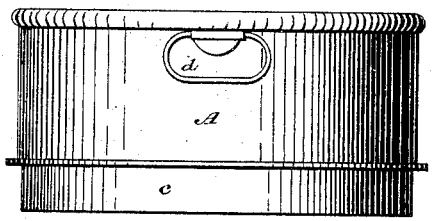
Figure 5:
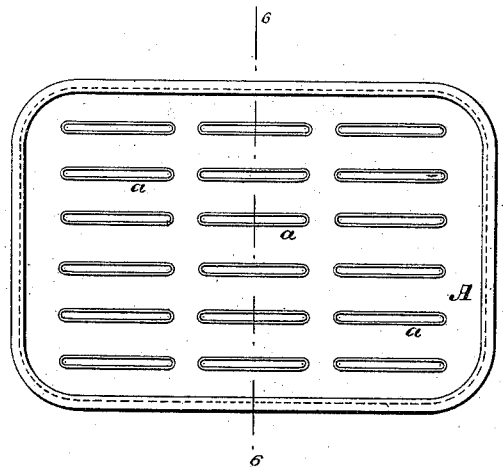
Figure 6:
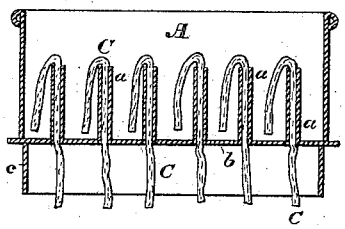

Figure 1 is a side elevation, and Fig. 2 a vertical mid-section. Fig. 3 is a plan of one of the separable filtering-vessels, and Fig. 4 is a side elevation thereof. Fig. 5 is a plan, and Fig. 6 is a transverse section, of a modification.

The construction shown in Figs. 1 to 4 consists of several cylindrical filtering-vessels, A A, fitting together one above another, and the lowest one fitting over a receiving-vessel, B. Each vessel A has a number of wick-tubes, $a\, a$, passing vertically through its bottom $b$, and fastened thereto by solder or otherwise, and in each tube is a wick, C, of suitable absorbent material—as cotton wicking—its upper portion extending beyond the upper end of the tube and hanging down to the bottom $b$, while its lower end extends down in the tube to below the bottom $b$, and terminates, preferably, at or below the lower end of the tube. Each vessel A is formed with a flange, $c$, extending below its bottom $b$, and fitting into the top of the vessel beneath it, and each is provided by preference with handles $d\, d$, by which to lift it. The three (more or less) vessels A A are all alike, except that the upper one (lettered A′) extends higher than the lower ones, ($A^2$ and $A^3$,) to give it sufficient capacity, and upon it is placed a cover, D, having a depressed central orifice, $e$, covered by a raised shield, $f$. The liquid to be filtered is poured onto the cover D, and runs down into the vessel A′. The receiving-vessel B for the filtered liquid is provided with a faucet, E, and with a glass gage, F, to show the level of liquid. The liquid in the upper vessel, A′, is drawn up by the several wicks, carried over the upper ends of the tubes and down through the tubes, and from their lower ends it falls in drops into the vessel $A^2$. Here the same operation is repeated, the liquid being carried over gradually into the vessel $A^3$, and there the operation is again repeated, finally depositing the filtered liquid in the vessel B. The wicks in each vessel draw up only the liquid, leaving behind all sediment and solid matters that may have become intermixed therewith, and also leaving behind more or less of any denser liquid impurities, which are not so readily drawn up by the wicks as the pure liquid. As many filtering-vessels should be arranged one above another as are necessary to thoroughly filter the liquid.

My improved filter is especially adapted to the filtration of oils, to separate them from impurities and foreign matters that may have become mixed with them, and is also well adapted to the filtration of various other liquids.

Instead of round tubes with round wicks, flat tubes with flat wicks may be used, as shown in Fig. 5, where the vessel is shown as rectangular instead of circular in plan.

It is not essential that the wick-tubes $a\, a$ be extended beneath the bottom $b$, as they may terminate at the bottom, as shown in Fig. 6.

I make no broad claim to a filter employing capillary siphons as the filtering medium, since I am well aware that wicks have been hung on the edge of a vessel containing a liquid to be filtered, hanging partly down the outside and partly into the vessel, an example of which construction is shown in the patent of Bonnefin, No. 250,418, dated December 6, 1881.

What I claim as new, and desire to secure by Letters Patent, is—

1. A filter consisting of the combination of a filtering-vessel provided with a series of wick-tubes projecting into it upward and through its bottom, a series of wicks in said tubes, their upper ends hanging over the tops of the tubes and their lower ends extending down within the tubes sufficiently far to cause the wicks to act as capillary siphons, and a receiving-vessel for the filtered liquid arranged beneath the bottom of the said vessel and receiving the drip from said wicks, substantially as and for the purposes set forth.

2. The combination, to form a capillary filter, of two or more filtering-vessels constructed to fit one above another, and each provided with wick-tubes inclosed within it extending upward from its bottom, with a closed receiving-vessel for the filtered liquid arranged beneath and fitting the lowermost filtering-vessel, substantially as set forth, whereby the liquid in the upper vessel is subjected to successive capillary filtrations, and the wicks are concealed and protected.

In witness whereof I have hereunto signed my name in the presence of two subscribing witnesses.

JOHN A. TUPPER.

Witnesses:
HENRY T. BALL,
MORRIS R. EVANS.